(12) United States Patent
Coryell et al.

(10) Patent No.: US 6,391,248 B1
(45) Date of Patent: May 21, 2002

(54) CIRCLE CUTTING ATTACHMENT FOR TORCH

(76) Inventors: Randy E. Coryell, 36241 Camp Creek Rd., Springfield, OR (US) 97478; John J. Jensen, 6770 E. Superstition View Dr., Apache Junction, AZ (US) 85219

( * ) Notice: Subject to any disclaimer, the term of this patent is extended or adjusted under 35 U.S.C. 154(b) by 0 days.

(21) Appl. No.: 09/842,329

(22) Filed: Apr. 24, 2001

(51) Int. Cl.[7] ................................................. B23K 7/10
(52) U.S. Cl. .......................................... 266/70; 266/48
(58) Field of Search ...................................... 266/48, 70

(56) References Cited

U.S. PATENT DOCUMENTS

| | | | |
|---|---|---|---|
| 1,084,692 A | * | 1/1914 | Bucknam ..................... 266/70 |
| 2,463,408 A | * | 3/1949 | Millis ......................... 266/70 |
| 4,157,814 A | | 6/1979 | Miller |
| 4,621,792 A | | 11/1986 | Thurston |
| 5,360,201 A | | 11/1994 | Balentine |
| 6,103,184 A | | 8/2000 | Heck |

* cited by examiner

*Primary Examiner*—Scott Kastler
(74) *Attorney, Agent, or Firm*—Robert E. Howard

(57) ABSTRACT

A circle cutting attachment device for a cutting torch. A torch tip sleeve is attached to the front end of the device and has a cylindrical opening passing therethrough that has a longitudinal axis that is angled forwardly through the body of the torch tip sleeve. A cradle arm adapted to engage the barrel of a cutting torch extends substantially perpendicularly above the rear end of the device. When the tip of a cutting torch is inserted into the cutting torch tip sleeve and the cradle engages the torch barrel, the torch attachment and torch are placed under bending stress which lockingly engages the tip of the torch to the torch tip sleeve and the cradle to the barrel of the torch.

8 Claims, 4 Drawing Sheets

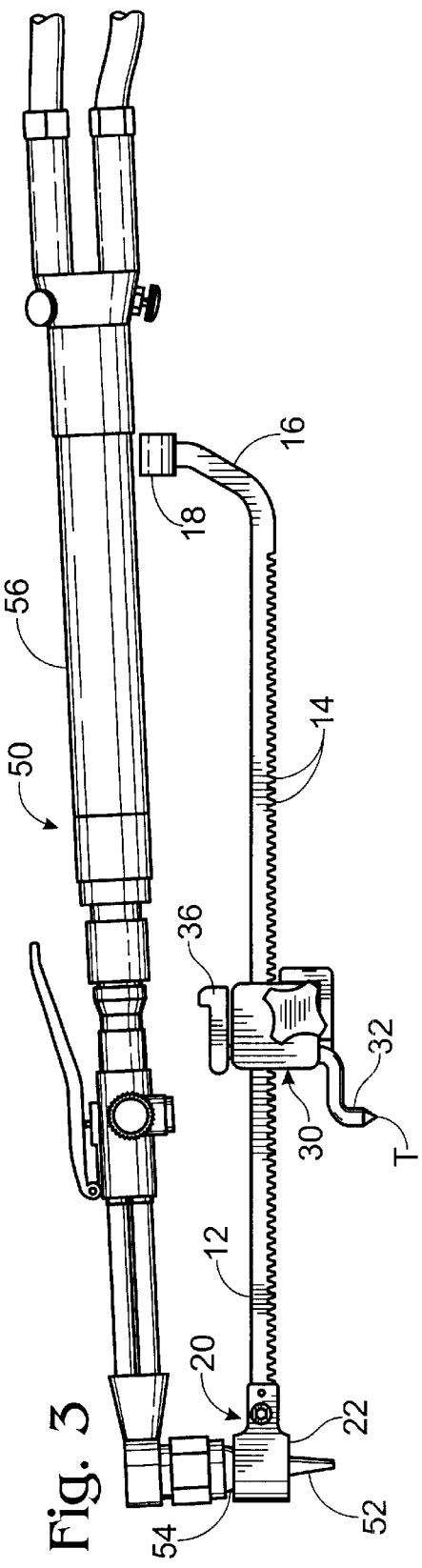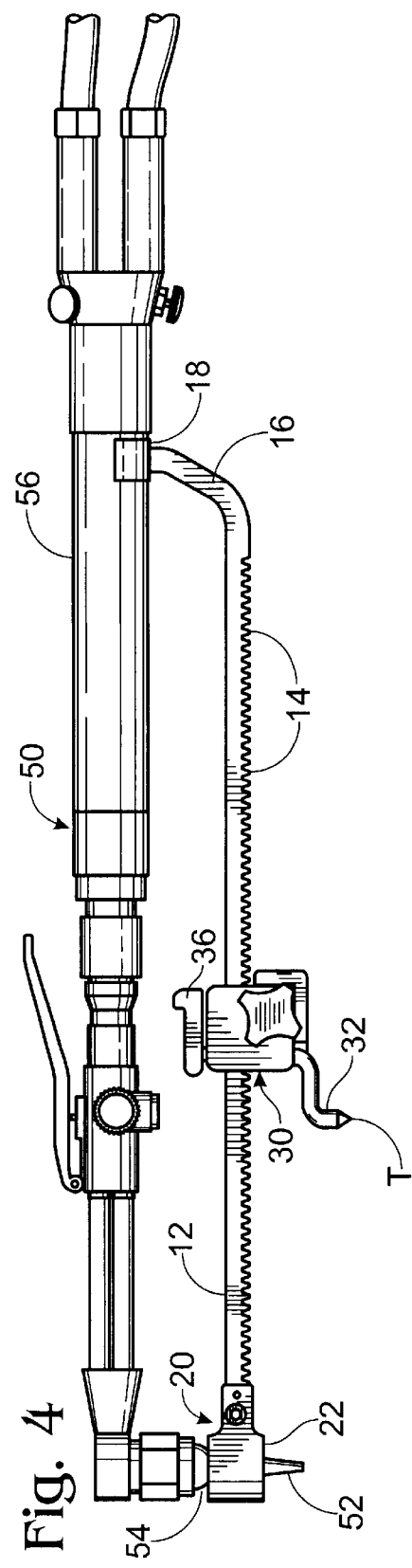

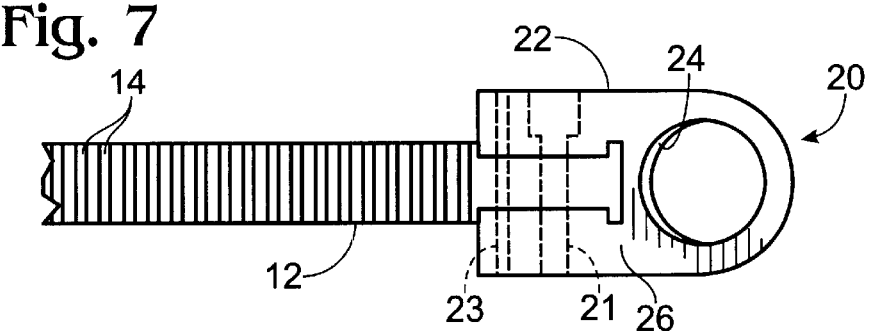
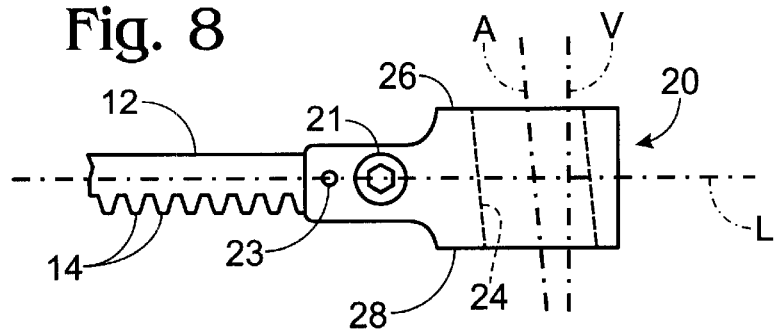
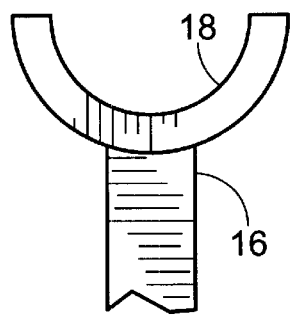
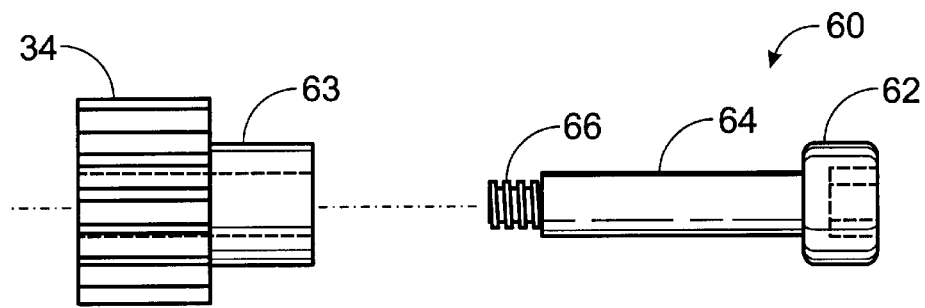

CIRCLE CUTTING ATTACHMENT FOR TORCH

BACKGROUND OF THE INVENTION

This invention relates to an attachment device for a metal cutting torch which allows the user to accurately cut circular holes through a metal workpiece.

There have been a number of devices proposed over the years for aiding in cutting circular holes through a metal workpiece. One such device is described in U.S. Pat. No. 4,157,814 issued to Miller. The Miller torch attachment includes an elongated body having a torch tip support member for receiving the torch tip and which can lock the torch tip into place by a thumb screw. The gas lines connected to the other end of the torch merely rest in a U-shaped cradle. A longitudinally adjustable V-shaped scribe member is placed into a hole located at the center of the circle to be cut. In practice the Miller device is not very satisfactory because the gas lines merely rest on the cradle, thereby allowing the torch to twist out of vertical alignment which causes the torch tip to be at an angle to the workpiece resulting in the edges of the hole being cut to not be perpendicular to the planar surfaces of the workpiece.

SUMMARY OF THE INVENTION

It is an object of the present invention to provide a circle cutting attachment device for a cutting torch that is locked to the torch in a manner that eliminates any movement of the torch relative to the attachment during use.

The circle cutting torch attachment device includes an elongated rack having a longitudinal axis, a front end, and a rear end. The rack has a lower planar surface with a plurality of gear teeth extending therefrom.

A torch tip sleeve is attached to the front end of the rack. The torch tip sleeve has a body with a cylindrical opening passing therethrough. The cylindrical opening has a longitudinal axis that is at an angle to the vertical.

A cradle arm extends substantially perpendicularly above the rear end of the rack. A U-shaped cradle is attached to the outer end of the cradle arm. The U-shaped cradle is adapted to tightly engage the barrel of a cutting torch.

A centering pin carriage is located on the rack. The rack passes through a channel in the carriage. The carriage has an internally located gear wheel with a plurality of gear teeth positioned and adapted to engage the gear teeth of the rack. The carriage has means for lockingly engaging the rack.

A centering pin extends downwardly from the centering pin carriage, and is adapted to engage and pivot about a guide hole located in the center of a metal workpiece.

BRIEF DESCRIPTION OF THE DRAWINGS

FIG. 3 is a side elevation view of the circle cutting torch attachment device of the present invention showing the relative positions of the attachment device and cutting torch during the attachment process;

FIG. 4 is a side elevation view of the circle cutting torch attachment device of the present invention showing the relative positions of the attachment device and a cutting torch in the fully locked together mode;

FIG. 7 is a top plan view of the torch tip sleeve of the circle cutting torch attachment device of the present invention;

FIG. 8 is a side elevation view of the torch tip sleeve of the circle cutting torch attachment device of the present invention;

FIG. 9 is a partial, front elevation view of the torch cradle of the circle cutting torch attachment device of the present invention; and FIG. 10 is a side elevation view of the shoulder bolt used to hold the pinion gear to the pinion gear carriage.

DESCRIPTION OF PREFERRED EMBODIMENTS

Figure 1:
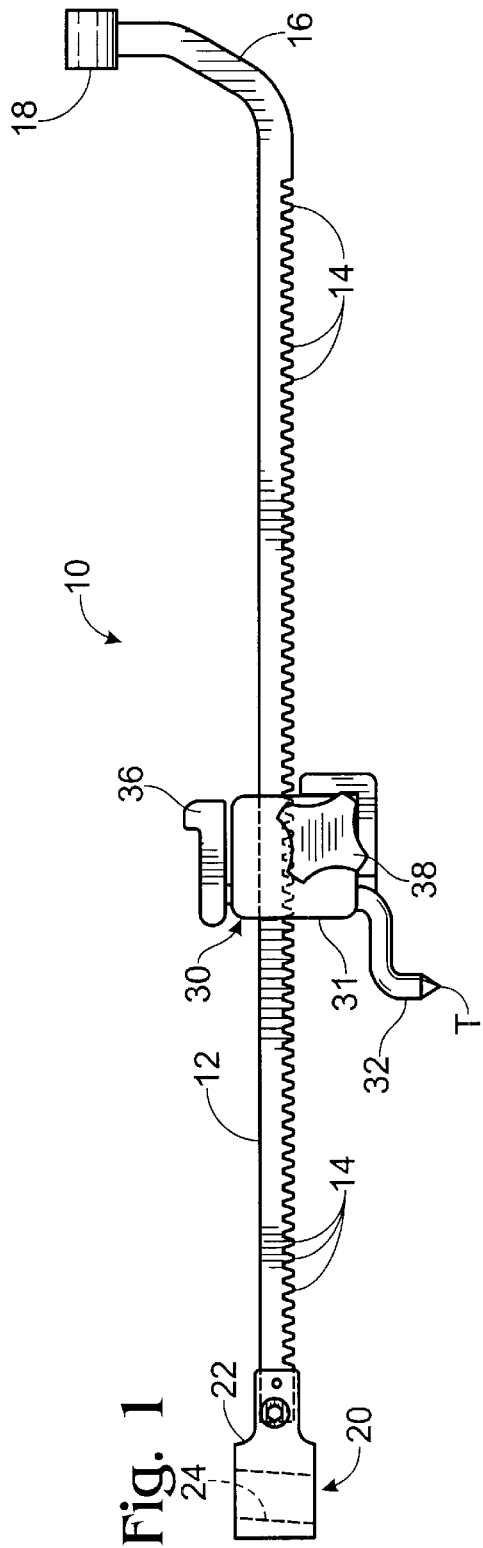
FIG. 1 is a side elevation view of the circle cutting torch attachment device of the present invention.

Circle cutting torch attachment 10 is shown in FIG. 1. Attachment 10 includes an elongated horizontal rack 12 that can be made of bar stock having a substantially square cross section. The thickness of the bar stock should not be so great as to prevent rack 12 from being slightly flexible, but large enough so that rack 12 is not permanently bendable. The length of rack 12 is such as to accommodate a cutting torch, as will be discussed below.

The bottom planar surface of rack 12 has a plurality of gear teeth 14 extending therefrom along the entire length thereof. Rack 12 is part of a rack and pinion gear system which will become apparent from the description to follow.

The rear end of rack 12 is bent upwardly at substantially a right angle to the longitudinal axis of rack 12 to form vertical cradle arm 16. A U-shaped cradle 18 is attached to the outer end of cradle arm 16, such as by welding.

The front end of rack 12 is "T" shaped and fits snugly into a T-shaped slot in torch tip sleeve 20. The T shape stabilizes sleeve 20 against movement. Torch tip sleeve 20 is attached to the front end of rack 12 by means of flat head screw 21 and dowel pin 23.

Tip sleeve 20 includes a body 22 through which cylindrical opening 24 passes. The longitudinal axis "A" of cylindrical opening 24 is at an angle to the vertical as seen in FIG. 8. By "vertical" is meant a line "V" that is perpendicular to the normally horizontal longitudinal axis extension of rack 12 (line "L" in FIG. 8). The angle between lines V and A is slight, being about two degrees. The direction of the angle of axis A of cylindrical opening 24 is "forwardly", i.e., axis A angles forward from its location at top 26 to its location at bottom 28 of torch tip sleeve 20. The purpose of angling cylindrical opening 24 forwardly will be explained below.

Figure 5:
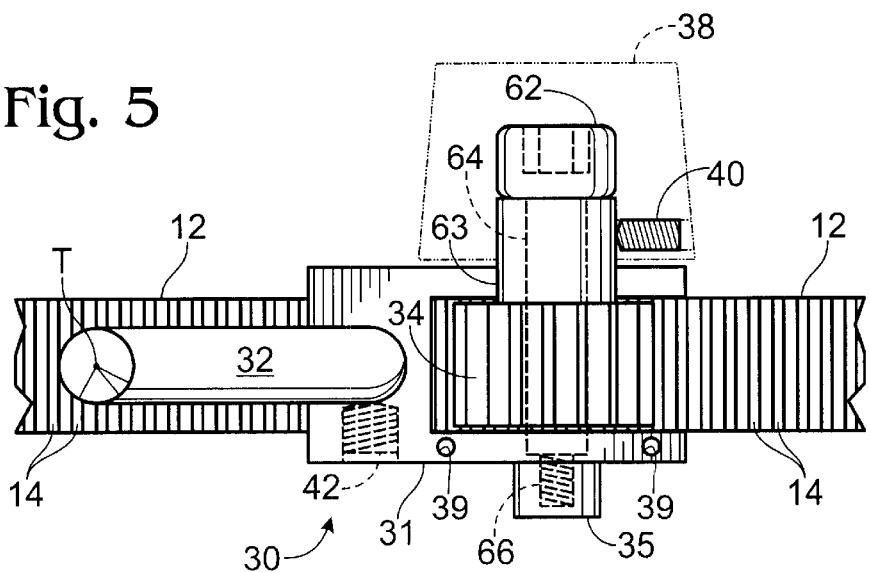
FIG. 5 is a partial bottom plan view of the pinion gear carriage mechanism of the circle cutting torch attachment of the present invention, shown with the pinion gear guard removed.
Figure 6:
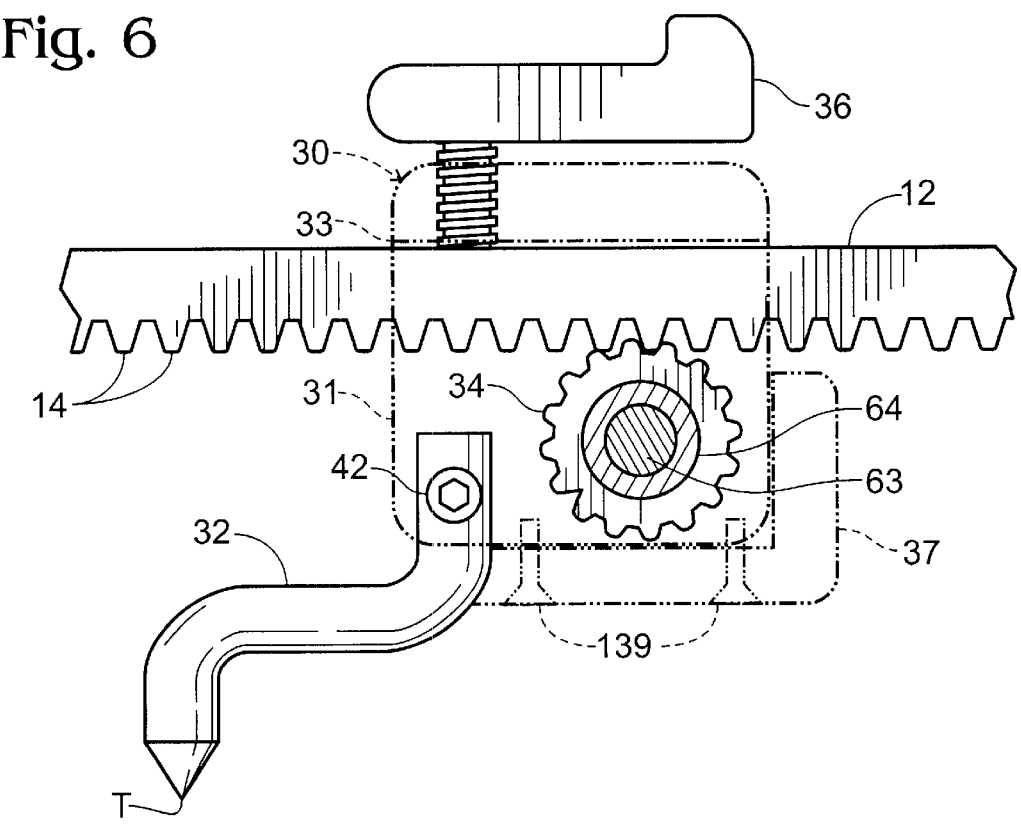
FIG. 6 is a side elevation view, partially in phantom, of the pinion gear carriage mechanism of the circle cutting torch attachment device of the present invention.

A pinion gear carriage 30 having a body 31 is located on rack 12, best seen in FIGS. 5 and 6. Rack 12 passes through a channel 33 in body 31 of pinion gear carriage 30. In FIG. 6 body 31 is shown in phantom for sake of clarity.

Centering pin 32 extends from the lower surface of body 31. The base of centering pin 32 is positioned in an opening in the bottom of carriage 30 and held in place by screw 42.

Pinion gear wheel 34 is rotatably attached to body 31 by shoulder bolt 60 which acts as an axle. Shoulder bolt 60 is shown in detail in FIG. 10, and includes head 62, shank 64 and threaded extension 66.

Pinion gear 34 has a hub including a hub extension 63 extending from one side thereof, as shown. Adjustment knob 38 is removably attached to hub extension 63 by means of screw 40. Adjustment knob 38 rotates about head 62 of shoulder bolt 60. Hub 63 of pinion gear 34 rotates about shank 64 of shoulder bolt 60. Threaded extension 66 of shoulder bolt 60 is screwed into the mating threads of journal 35.

The teeth of pinion gear wheel 34 mesh with teeth 14 of rack 12. When thumb set screw 36 is loosened, pinion gear carriage 30 is free to move back and forth along rack 12 by merely pushing body 31. Fine positioning can be made by turning adjustment knob 38.

A pinion gear guard 37 covers the open bottom and open rear end of pinion gear carriage 30 (as seen in FIG. 6) and is attached to the bottom of the carriage by pan head set screws 139 engaging tapped holes 39.

Figure 2:
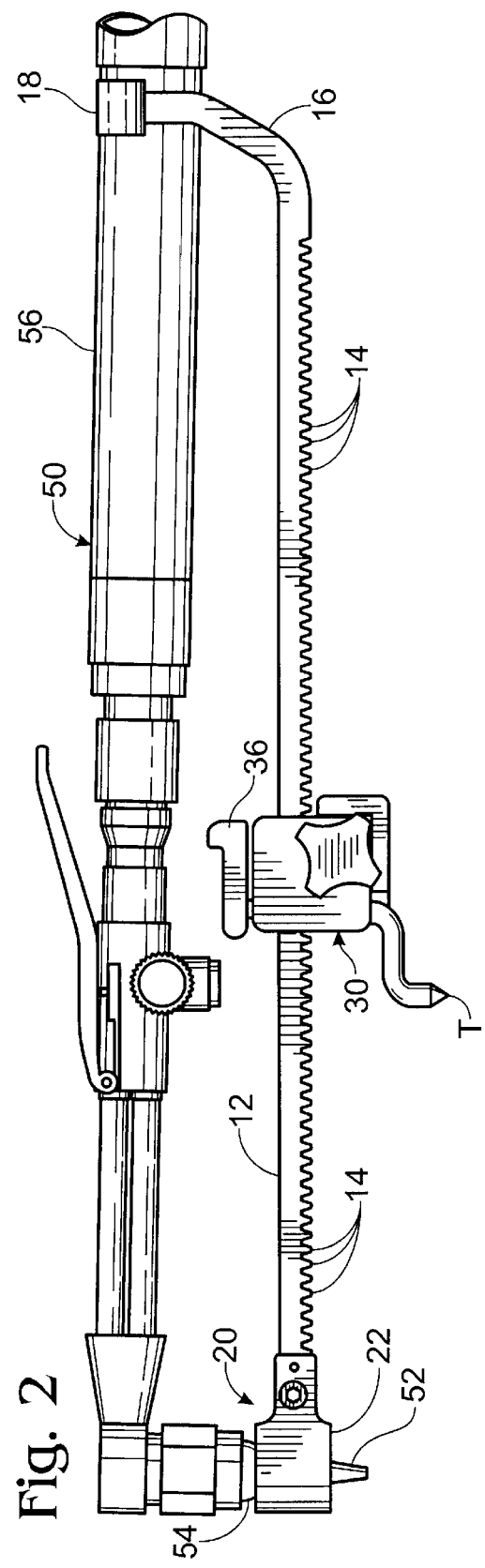
FIG. 2 is a side elevation view of the circle cutting torch attachment device of the present invention showing the relative positions of the attachment device and a cutting torch prior to locking the attachment device to the cutting torch.

In operation, a cutting torch 50 is positioned so that the cutting tip 52 thereof passes through cylindrical opening 24 of torch tip sleeve 20 with shoulder 54 being in abutment with body 22. The diameter of cylindrical opening 24 is such as to cause the walls thereof to tightly engage cutting tip 52. Because the axis A of opening 24 is at a forward angle to vertical (as shown by line V), the rear of torch 50 and the rear of attachment 10 are inclined towards each other, i.e., the distance between the longitudinal axis of torch 50 and the longitudinal axis of rack 12 decreases as the distance away from tip sleeve 20 increases, as can best be seen in FIG. 2. In this unstressed mode (cradle 18 being positioned beside and adjacent to barrel 56 of torch 40) the bottom of cradle 18 is located above the bottom of barrel 56 of torch 50.

To lock torch 50 to attachment 10, the outer end of rack 12 is pulled downwardly until the top of cradle 18 is just below the bottom of barrel 56, as seen in FIG. 3. Rack 12 is then pushed toward barrel 56 (the tip 42 located within torch tip sleeve 20 acting as a pivot rod) so that the longitudinal axes of rack 12 and torch 50 come into alignment. Rack 12 is then released so that cradle 18 is urged upwardly into tight engagement with the bottom of barrel 56, as seen in FIG. 4, due to the upward bending stress imposed on rack 12 by virtue of the fact it is slightly bent and downward bending stress imposed on torch 50 by virtue of the fact is also slightly bent.

At the same time, the bending stresses imposed between torch 50 and attachment device 10 cause the outer surface of tip 52 of torch 50 to be urged into tight engagement with the wall of cylindrical opening 24 of torch tip sleeve 20. Thus, attachment device 10 is tightly locked to torch 50 at both the torch tip sleeve 20 and cradle 18.

The distance between the torch tip 52 and the tip "T" of centering pin 32 is adjusted by loosening thumb set screw 36 and moving pinion gear carriage 30 along rack 12, using adjustment knob 38 for final adjustment to obtain the desired radius of the circle to be cut, and thumb set screw 36 tightened to lock in place the position of pinion gear carriage 30 on rack 12. A hole is drilled or punched into or through the metal substrate at the center of the hole to be cut, and the tip of centering pin 32 inserted. The torch 50 is lit, and the user slowly turns the attachment 10 and attached torch 50 around the pivot formed by the tip of placement pin 32 to cut the desired circular hole through the metal substrate.

Upon completion of cutting the circular hole, the attachment 10 is removed from torch 50 by reversing the steps discussed above for its attachment.

Any cutting torch having a configuration similar to that illustrated in the drawings may be used with the hole cutting attachment 10 of the present invention. One such torch is a Victor Model CA2460 journeyman's torch.

Herein whenever the phrases "upper" or "lower" are used, it is with reference to the position of the components as they are illustrated in FIGS. 1–4, with "upper" being toward the top of the drawing and "lower" being toward the bottom of the drawing. Similarly, the phrases "vertical" and "horizontal" refer to the vertical or horizontal axes of FIGS. 1–4, and as described relative to lines V and L, respectively, in FIG. 8. The "front" end of attachment 10 or torch 50 refer, respectively, to the ends containing the torch tip sleeve 20 or torch tip 52, with the "rear" end being the end opposite the front end.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A circle cutting attachment for a cutting torch having a cutting tip at one end and a barrel attached to gas lines at the other end comprising:
   an elongated rack having a longitudinal axis, a front end, and a rear end, said rack having a lower surface with a plurality of gear teeth extending therefrom;
   a torch tip sleeve attached to the front end of said rack, said torch tip sleeve having a body with a top and a bottom, a cylindrical opening passing through said body, said cylindrical opening having a longitudinal axis that is angled forwardly through said torch tip sleeve body from said top to said bottom;
   a cradle arm extending upwardly from the rear end of said rack;
   a cradle attached to the outer end of said cradle arm, said cradle being adapted to tightly engage the barrel of a cutting torch;
   a pinion gear carriage having a channel extending therethrough, said rack extending through said channel, said carriage having a pinion gear rotatably attached to said carriage, said pinion gear having a plurality of gear teeth positioned and adapted to engage said gear teeth of said rack, said carriage having means for locking said carriage to said rack; and
   a centering pin extending downwardly from said pinion gear carriage.

2. The attachment of claim 1 wherein the longitudinal axis of said cylindrical opening of said torch tip sleeve is angled forwardly about two degrees to a vertical line perpendicular to the longitudinal axis of said elongated rack.

3. The attachment of claim 1 wherein said cylindrical opening of said torch tip sleeve has a diameter adapted to cause the wall of said cylindrical opening to tightly engage the cutting tip of a cutting torch.

4. The attachment of claim 1 wherein said pinion gear has a hub and is rotatably attached to said pinion gear carriage by means of an axle passing through said hub, said axle being fixedly attached to said pinion gear carriage.

5. The attachment of claim 4 wherein said axle is a shoulder bolt having a shank, a head attached to one end of said shank and a threaded extension extending from the other end of said shank, said threaded extension being screwed into a threaded journal.

6. The attachment of claim 5 wherein said hub has a hub extension extending outwardly from said pinion gear and an adjustment knob is attached to said hub extension.

7. A circle cutting attachment for a cutting torch having a cutting tip at one end and a barrel attached to gas lines at the other end, and a longitudinal axis, comprising:

an elongated rack having a longitudinal axis, a front end, and a rear end, said rack having a lower surface with a plurality of gear teeth extending therefrom;

a cradle arm extending upwardly from the rear end of said rack;

a cradle attached to the outer end of said cradle arm, said cradle being adapted to engage the barrel of a cutting torch;

a torch tip sleeve attached to the front end of said rack, said torch tip sleeve having a body with a top and a bottom, a cylindrical opening passing through said body, said cylindrical opening having a longitudinal axis that is angled forwardly through said torch tip sleeve body from said top to said bottom, said cylindrical opening of said torch tip sleeve having a diameter adapted to cause the wall of said cylindrical opening to tightly engage the cutting tip of a cutting torch, said angled forwardly longitudinal axis causing the distance between the longitudinal axis of said torch and the longitudinal axis of said rack to decrease as the distance away from said torch tip sleeve increases whereby when the cutting tip of a torch is tightly engaged by the cylindrical opening of said torch tip sleeve and said cradle engages the barrel of a cutting torch, the longitudinal axes of said cutting torch and said rack are substantially parallel and said cradle is urged upwardly into tight engagement with said barrel by bending forces acting on said torch and said rack;

a pinion gear carriage having a channel extending therethrough, said rack extending through said channel, said carriage having a pinion gear rotatably attached to said carriage, said pinion gear having a plurality of gear teeth positioned and adapted to engage said gear teeth of said rack, said carriage having means for locking said carriage to said rack; and a centering pin extending downwardly from said pinion gear carriage.

8. The attachment of claim 7 wherein the longitudinal axis of said cylindrical opening of said torch tip sleeve is angled forwardly about two degrees to a vertical line perpendicular to the longitudinal axis of said elongated rack.

\* \* \* \* \*